United States Patent
Chew et al.

(10) Patent No.: US 10,858,268 B2
(45) Date of Patent: Dec. 8, 2020

(54) METHOD AND SYSTEM FOR APPLYING SUPERIMPOSED TIME-VARYING FREQUENCY ELECTROMAGNETIC WAVE TO TARGET OBJECT OR TARGET REGION

(71) Applicant: SEMB-ECO R&D PTE LTD, Singapore (SG)

(72) Inventors: Hwee Hong Chew, Singapore (SG); Poh Kwee Ong, Singapore (SG)

(73) Assignee: Semb-Eco R&D Pte Ltd, Singapore (SG)

( * ) Notice: Subject to any disclaimer, the term of this patent is extended or adjusted under 35 U.S.C. 154(b) by 374 days.

(21) Appl. No.: 15/748,499

(22) PCT Filed: Jul. 29, 2015

(86) PCT No.: PCT/SG2015/050239
§ 371 (c)(1),
(2) Date: Jan. 29, 2018

(87) PCT Pub. No.: WO2017/018930
PCT Pub. Date: Feb. 2, 2017

(65) Prior Publication Data
US 2018/0222777 A1    Aug. 9, 2018

(51) Int. Cl.
*C02F 1/46* (2006.01)
*C02F 1/48* (2006.01)
(Continued)

(52) U.S. Cl.
CPC ............ *C02F 1/4602* (2013.01); *C02F 1/004* (2013.01); *C02F 1/32* (2013.01); *C02F 1/46104* (2013.01);
(Continued)

(58) Field of Classification Search
CPC . B08B 17/00; B08B 17/02; C02F 1/46; C02F 1/4602; C02F 1/461; C02F 1/46104;
(Continued)

(56) References Cited

U.S. PATENT DOCUMENTS 4,869,016 A * 9/1989 Diprose .................. B63B 59/04
                                                    43/124
2004/0206680 A1    10/2004 Johnson
(Continued)

FOREIGN PATENT DOCUMENTS

ES         2008549 A6      7/1989
KR         10-1408298      7/2014
(Continued)

OTHER PUBLICATIONS

International Search Report and Written Opinion, issued in the corresponding PCT application serial No. PCT/SG2015/050239, dated Apr. 28, 2016, 11 pages.

*Primary Examiner* — Alexander W Keeling
(74) *Attorney, Agent, or Firm* — Cesari & McKenna, LLP (57) ABSTRACT

The invention relates to a system for applying a superimposed time-varying frequency electromagnetic wave to a target object or a target region that is formed by the target object and a medium surrounding the target object, comprising a device for generating a superimposed time-varying frequency electromagnetic wave where the time-varying AC wave is riding on the predefined DC bias voltage. When applied to the object or region, the superimposed time-varying frequency electromagnetic wave is able to induce a flow of ionic current having a DC component traveling in a pulsating and time-varying manner in the target object and/or in the medium and effect induced vibration of electrons and molecules of the target object and the medium. The invention also relates to a method applying a superimposed time-varying frequency electromagnetic wave to a target
(Continued)

object or a target region. The method and the system of the invention significantly reduce the capital cost and require very low energy, with the environmentally friendly final products, and are able to result in various treatment effects simultaneously.

16 Claims, 9 Drawing Sheets (51) Int. Cl.
*C02F 1/461* (2006.01)
*C23F 13/04* (2006.01)
*C23F 13/06* (2006.01)
*C02F 1/00* (2006.01)
*C02F 1/32* (2006.01)
*C02F 5/00* (2006.01)
*C02F 103/00* (2006.01)
*C02F 103/08* (2006.01)
*C02F 103/18* (2006.01)

(52) U.S. Cl.
CPC .............. *C02F 1/484* (2013.01); *C02F 1/487* (2013.01); *C02F 5/00* (2013.01); *C23F 13/04* (2013.01); *C23F 13/06* (2013.01); *C02F 2103/007* (2013.01); *C02F 2103/008* (2013.01); *C02F 2103/08* (2013.01); *C02F 2103/18* (2013.01); *C02F 2201/4614* (2013.01); *C02F 2201/46125* (2013.01); *C02F 2201/46175* (2013.01); *C02F 2201/483* (2013.01); *C02F 2303/04* (2013.01); *C02F 2303/08* (2013.01); *C02F 2303/20* (2013.01); *C23F 2213/32* (2013.01)

(58) Field of Classification Search
CPC .. C02F 1/48; C02F 1/484; C02F 1/487; C02F 2303/20; C23F 13/00–13/22; C23F 15/00–15/005
See application file for complete search history.

(56) References Cited

U.S. PATENT DOCUMENTS

| | | | |
|---|---|---|---|
| 2007/0029261 A1* | 2/2007 | Chew | ........................ C02F 1/48 |
| | | | 210/695 |
| 2007/0235379 A1 | 10/2007 | Suddath | |
| 2011/0143413 A1 | 6/2011 | Ren et al. | |
| 2011/0174304 A1 | 7/2011 | Triplett, II et al. | |
| 2011/0248019 A1* | 10/2011 | Chew | ........................ F17D 1/16 |
| | | | 219/600 |

FOREIGN PATENT DOCUMENTS

| | | | | |
|---|---|---|---|---|
| WO | WO-2010/069110 A1 | | 6/2010 | |
| WO | WO-2014035332 A1 * | | 3/2014 | ............ B63B 59/04 |

* cited by examiner

METHOD AND SYSTEM FOR APPLYING SUPERIMPOSED TIME-VARYING FREQUENCY ELECTROMAGNETIC WAVE TO TARGET OBJECT OR TARGET REGION

CROSS REFERENCE TO RELATED APPLICATIONS

This application is the National Stage of International Application No. PCT/SG2015/050239, filed Jul. 29, 2015, the content of which is being incorporated by reference in its entirety for all purposes.

FIELD OF THE INVENTION

This invention relates generally to the field of treatment of an object or a region in order for one or more treatment effects. More particularly, the invention relates to method and system for applying superimposed time-varying frequency electromagnetic wave comprising both AC and DC components in pulsating manner to the target object or the target region.

BACKGROUND OF THE INVENTION

In many cases, treatment of an object or a region formed by the object and the medium surrounding the object is necessary in order for the treatment effects, such as preventing corrosion, controlling bacteria and biological growth, controlling scale formation, water-hardness softening, gas emission control, fuel oil treatment, control of crystallization, fermentation process, and the like.

Presently, various physical and chemical treatment methods as well as electrolysis methods are employed to obtain the respective treatment effects. For example, the physical treatment methods include methods of permanent or electro magnet treatment, high voltage electrostatic treatment, pulsed powered AC electromagnetic treatment and ultra violet light treatment. The chemical treatment methods based on the chemical reaction principles, in which chemicals harmful to the environment are used and frequently products as a result of the chemical reactions are environmental unfriendly. One example of the chemical treatment methods is the chemicals such as phosphate-based scale inhibitors are used to keep the calcium ions to remain dissolved in water without precipitation in order for the control of scaling and corrosion issues in water.

However, the prior art physical and chemical treatment methods have their own deficiencies and limitations and impeded their full practical implementation in the actual applications. The chemical treatment methods are known to do harm to the environment. As to the physical treatment methods, they are generally designed for single purpose application to solve only one of the many treatment issues with only one treatment effect achieved; and they are not provided to solve all the problems simultaneously unless different physical methods are used together but in practice many of them resort to using the environment unfriendly chemicals to meet all the treatment expectations.

Among the physical methods, some are using either direct current (DC) or pure AC time-varying frequency electromagnetic wave for various treatment effects. For the DC current-based methods, only constant DC direct current is applied without the AC alternating wave. For the pure AC time-varying frequency electromagnetic wave-based methods, only the AC alternating wave is applied and will not produce the effects of DC. Even if the DC and AC methods are applied separately at the same time, the result of such a combination is to produce the static DC current and the effects of the pure AC wave.

It has been always a challenge to develop alternative technologies for obtaining various treatment effects that are effective and cause no harm to the environment, advantageously able to achieve the various treatment effects all in one go. Therefore, there is a need for new methods and systems that are capable of simultaneously achieving the various treatment effects, and do not cause a harm to the atmosphere, aqueous and soil environments without the need of consideration of storage and disposal of final products and by-products.

SUMMARY OF THE INVENTION

The present invention has been developed to fulfill the needs noted above and therefore has a principle object of the provision of a system for applying superimposed time-varying frequency electromagnetic wave to a target object or a target region which is environmentally sound and does not leach chemicals products into the water and the soil.

Another object of the invention is to provide a system for applying superimposed time-varying frequency electromagnetic wave to a target object or a target region which is significantly more economical and convenient to utilize.

A yet further object of the invention is to provide a system for applying superimposed time-varying frequency electromagnetic wave to a target object or a target region which allows for achievement of various desired treatment effects simultaneously.

These and other objects and advantages of the invention are satisfied by providing a system for applying a superimposed time-varying frequency electromagnetic wave to a target object or a target region that is formed by the target object and a medium surrounding the target object, comprising:

a device for generating a superimposed time-varying frequency electromagnetic wave and having at least two output terminals, comprising:
  an alternating current (AC) wave generator for generating an AC driving signal of AC electromagnetic wave having a time-varying frequency at a desired sweeping time, and,
  a direct current (DC) biasing unit electrically coupled in series with the AC wave generator and for producing an DC output with a predefined DC bias voltage, the DC biasing unit being configured such that the DC output is mixed with the AC driving signal to produce a superimposed time-varying frequency electromagnetic wave where the time-varying frequency AC wave is riding on the predefined DC bias voltage, and
an actuator provided at one or each of both of a first excitation site and a second excitation site of the target object or the target region and electrically coupled in series with the output terminal of the device, wherein the device is electrically coupled in series with the first excitation site and the second excitation site of the target object or the target region directly or through the actuator, such that the superimposed time-varying frequency electromagnetic wave is applied to the target object or the target region, and wherein the DC bias output and the AC driving signal are superimposed such that the superimposed time-varying frequency electromagnetic wave is able to induce a flow of ionic current having a DC component traveling in a pulsating and time-varying manner in the target object and/or in the medium and effect induced vibration of electrons and molecules of the target object and the medium.

According to the invention, the DC biasing unit may be selected from the group consisting of switch mode DC power supply, an AC to DC converter, a rechargeable DC battery and an inductive diode filter. The device for generating the superimposed time-varying frequency electromagnetic wave is provided as a prefabricated electronic circuitry. The DC biasing unit may provide a variable DC bias voltage or a fixed DC bias voltage according to the actual needs and requirements.

In some cases, the DC bias voltage is selected such that the superimposed time-varying frequency electromagnetic wave is produced to have polar asymmetry or become a unidirectional pulsating wave, or the DC biasing unit is selected to produce the superimposed time-varying frequency electromagnetic wave that has half-wave distortion or full-wave distortion.

The positions of the first and second excitation sites may be varied according to the actual needs and requirements. The two excitation sites may be arranged on a same surface of the object in a spaced relation or on two different surfaces of the object. It is possible that one of the first and second excitation sites is positioned on the object, and the other is positioned in the medium surrounding the object.

In one embodiment of the invention, the AC wave generator comprises a control unit configured to generate a signal having the time-varying frequency AC electromagnetic wave at the desired sweeping time, and one or more bridge-type circuit coupled to the control unit for receiving the signal generated from the control unit, the bridge-type circuit being driven by the received signal to generate and amplify the AC driving signal of the time-varying frequency AC electromagnetic wave, wherein the bridge-type circuit is configured to comprise one or more half-bridge driver integrated circuits (ICs) and one or more Metal Oxide Semiconductor Field Effect Transistors (MOSFETs) coupled to the respective half-bridge driver ICs. In another embodiment of the invention, the control unit comprises a programmable integrated circuit (IC) for time-varying the frequency of the AC driving signal, and optionally a stabilizer circuit for stabilizing the AC driving signal.

Advantageously, the frequency of the superimposed time-varying frequency electromagnetic wave is about 100 Hz and about 1 MHz, preferably between about 100 Hz and about 200 KHz, preferably between about 100 Hz and about 500 KHz. The sweeping frequency of the superimposed time-varying frequency electromagnetic wave is between about 1 Hz and about 1 KHz, preferably between about 10 Hz and about 100 Hz.

Another aspect of the invention is to provide a method for applying a superimposed time-varying frequency electromagnetic wave to a target object or a target region that is formed by the target object and a medium surrounding the target object, comprising the steps of:

generating a superimposed time-varying frequency electromagnetic wave where an AC driving signal with time varying frequency is riding on a DC output with a predefined DC bias voltage, and subjecting the target object or the target region to the generated superimposed time-varying frequency electromagnetic wave so as to excite the target object or the target region, wherein the excitation causes to induce a flow of ionic current having a DC component traveling in a pulsating and time-varying manner in the target object and/or in the medium and effect induced vibration of electrons and molecules of the target object and the medium.

Unlike the methods and systems known in the prior art, the essence of the invention is to use the superimposed time-varying frequency electromagnetic wave to apply onto the object or the region to be treated. Therefore, the object or the region would be simultaneously subject to the effect of the electrical and magnetic fields and the effect of pulsating DC component. As a result, the current produced in the conductive object or in the medium may carry the pulsating positive and negative charged ions, electrons or other charges, which increases the vibration and rotational internal energy of molecule clusters and dissolved ions as well as causes the direct excitation of the object and the medium. In this way, various treatment effects would be obtained effectively, due to the pulsating ionic electromagnetic wave nature.

To have a better understanding of the invention reference is made to the following detailed description of the invention and embodiments thereof in conjunction with the accompanying drawings.

BRIEF DESCRIPTION OF THE DRAWINGS

In the drawings, like parts are designated by like reference numerals.

DETAILED DESCRIPTION OF THE PREFERRED EMBODIMENTS

While this invention is illustrated and described in preferred embodiments, the system for applying a superimposed time-varying frequency electromagnetic wave to a target object or a target region may be produced in many different configurations, sizes, forms and materials.

The term "object" used herein may be made of metallic or non-metallic materials and take any shape.

The term "medium" used herein may refer to a gas, a liquid or a solid or any combination thereof, which surrounds the object, and the medium and the object form together a region that requires for desirable treatment effects. Advantageously, the medium is ionized or conductive, for example electrolyte like water, oil, soil and the like. The term "actuator" used herein may refer to an element that is able to employ the superimposed time-varying frequency electromagnetic wave to energize the target object or the target region, such that the target object or region is subject to the treatment of the superimposed time-varying frequency electromagnetic wave.

Figure 1:
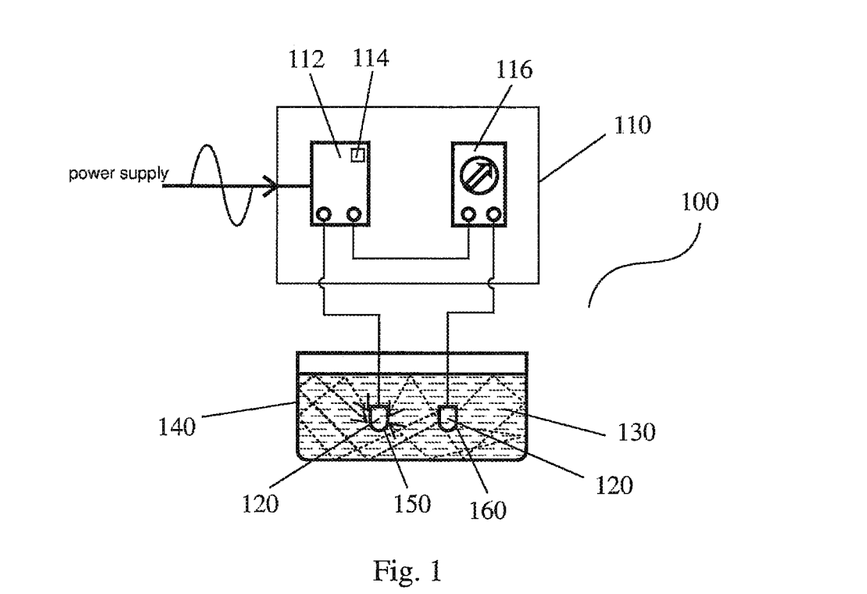
FIG. 1 is a schematic view of an exemplary arrangement of a system which is constructed in accordance with a first embodiment of the invention.

Referring now to the drawings, FIG. 1 provides a system 100 constructed consistent with a first embodiment of the present invention. In this embodiment, the system 100 comprises a device 110 for generating a superimposed time-varying frequency electromagnetic wave. The device 110 comprises an alternating current (AC) wave generator 112 and a direct current (DC) biasing unit 116 which are electrically coupled with the AC wave generator 112 in series. The system 100 further comprises two actuators 120 each electrically coupled with a respective output terminal of the device 110.

As shown in FIG. 1, the actuators 120 are immersed in a conductive liquid 130 (for example seawater) contained in a container 140. The actuator of the invention serves to energize the conductive liquid 130 with the superimposed time-varying frequency electromagnetic wave. A first excitation site 150 and a second excitation site 160 are arranged in spaced relation in the liquid, their connection with the actuators 120 do not cause the problem of short circuiting. As such, the device 110, the actuators 120 and the conductive liquid 130 form together a closed loop circuit. In this embodiment, the liquid 130 is to be treated for the purposes of control of bacteria and biological growth, control of scale formation, water-hardness of softening. The material of the actuators 120 can be any metals, solid conductive materials or conductive material coated materials, and can be selected from the group consisting of steel, copper, zinc, graphite, stainless steel, titanium, metal oxide coated titanium and the like. The shape of the actuators 120 can be of any geometrical shape including round, square, rectangular, triangular shape, and may be provided in the form of bar, rods, tube, dish, plates, sphere, cubes, hollow, solid, perforated, mesh, etc. The actuators 120 may be immersed in the liquid, buried in soil or it can be a direct excitation on the conductive materials including metallic and non-metallic materials or structures.

Figure 10:
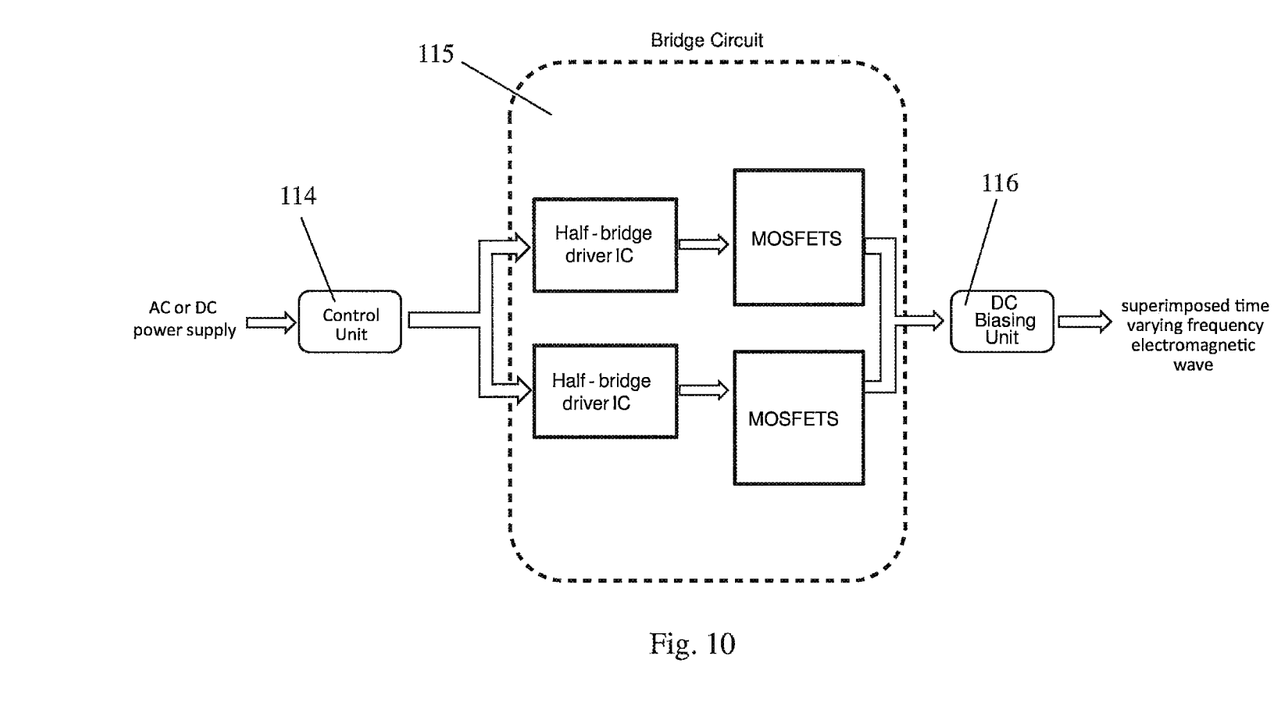
FIG. 10 is a schematic view of an exemplary AC wave generator according to one embodiment of the invention.

The AC wave generator 112 is electrically coupled with a power supply and configured for generating an AC driving signal of AC electromagnetic wave having a time-varying frequency at a desired sweeping time. The power supply can be a DC or AC power supply. In the preferred embodiment of the invention, the power supply is advantageously of DC nature and provides an input DC signal to the AC wave generator 112. As illustrated in FIG. 10, the AC wave generator 112 in this embodiment comprises a control unit 114 configured and programmed to generate a signal having the desired time-varying frequency at the desired sweeping time, this signal generated by the control unit 114 is in the magnitude of milliampere. The AC wave generator 112 further comprises one or more bridge-type circuit 115 electrically coupled to the control unit 114 to receive the signal generated by the control unit 114. The bridge-type circuit 115 is configured to be driven by the received signal to generate and amplify an AC driving signal in the magnitude of milliampere to ampere, for example. This AC driving signal corresponds to the time-varying frequency AC electromagnetic wave having the desired sweeping time and would be delivered to the DC biasing unit 116 for the superimposition with the DC output. The bridge-type circuit 115 comprises two sets of sub-circuits in parallel as illustrated. Each of the sub-circuits comprises a half-bridge driver integrated circuit in connection with two or more MOSFETs. If the main AC source is applied, an AC-to-DC converter may be embedded in the AC wave generator 112 for converting the AC power supply to a DC power supply which is then applied to the control unit 114. The power supply applies to the AC wave generator 112 a voltage according to the actual applications, for example between about 12V to about 200V.

The various electronic components in the AC wave generator 112 may be provided in a printed circuit board (PCB). If the AC-to-DC converter or rectifier is needed, it may also be mounted in the PCB as a compact structure.

As mentioned above, the control unit 114 generates the time-varying frequency signal at the desired sweeping time. The sweeping time is selected to ensure the liquid has the correct time frame to expose to the corresponding frequency for the correct exposure time period. For different applications, a wide range of frequency may be selected. Preferably, the frequency of the superimposed time-varying frequency electromagnetic wave used in the invention may be in the range of 100 Hz to 1 MHz, preferably in the range of 100 Hz to 200 kHz, with the sweeping frequency between about 1 Hz to 1 kHz, preferably in the range of 10 Hz and 100 Hz. The wave form of the superimposed time-varying frequency electromagnetic wave can be square, triangular, rectangular, sinusoidal or other forms. In this embodiment, the control unit 114 comprises a programmable integrated circuit (IC) for time-varying the frequency of the AC driving signal, and a stabilizer circuit for stabilizing the AC driving signal.

The direct current (DC) biasing unit 116 is electrically coupled in series with the AC wave generator 112 and configured for producing a DC output with a predefined DC bias voltage which may be varied or fixed. The DC biasing unit 116 is programmed such that the DC output is mixed the amplified AC driving signal received from the AC wave generator 112 to produce the superimposed time-varying frequency electromagnetic wave where the time-varying AC wave is riding on the predefined DC bias voltage. In this embodiment, the DC biasing unit 116 is a switch mode DC power supply. A rechargeable DC battery or AC-to-DC rectifier power supplies are possible for the DC biasing unit 116. When the rechargeable DC battery is used as the DC biasing unit 116, an extremely pure DC output would be generated and is particularly suitable for some applications requiring the extremely pure DC source.

It is advantageous that the DC bias voltage matches the voltage and frequency of the AC pulsating wave coming from the AC wave generator 112. In general the DC bias voltage is lower than the time varying pulsating wave voltage. The DC bias voltage is therefore made with adjustable arrangement to suit the different onsite treatment requirements. In some cases, the DC bias source is configured to be able to take the inflow of current/voltage when the time varying pulsating AC wave surge into the DC bias source.

One feature of the invention is that the unique superimposed time-varying frequency electromagnetic wave can be generated only when the right combination of the AC wave generator 112, the DC biasing unit 116 and the actuators 120 connected from one another in series.

The superimposed time varying frequency electromagnetic wave of the invention is different from the simple combination of applying a DC component and a separate time varying frequency AC wave. By applying separately the DC component and the time varying frequency AC wave, there is no superimposed DC pulsed wave produced or presented in the liquid. The DC component is static and would exert separately its own DC effect, and the separate time varying frequency AC wave, which is balanced in positive and negative amplitude without the DC characteristics, would exert its own effect too.

Figure 5A:
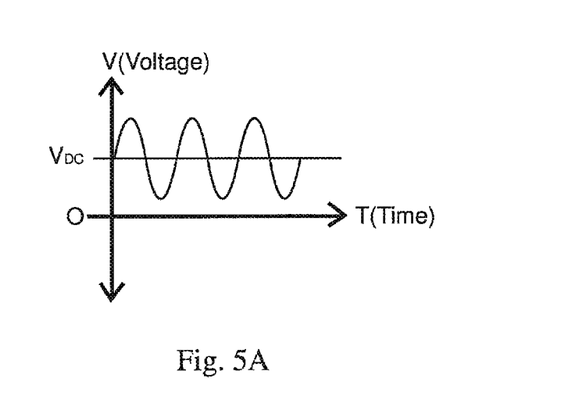
FIG. 5A to 5C are schematic views of first exemplary wave forms of the superimposed time-varying frequency electromagnetic wave according to the invention.
Figure 5B:
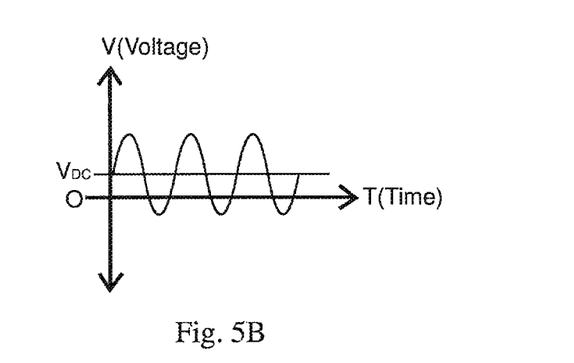
Figure 5C:
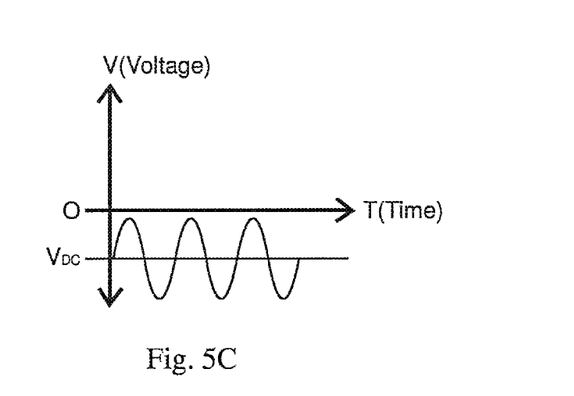
Figure 6A:
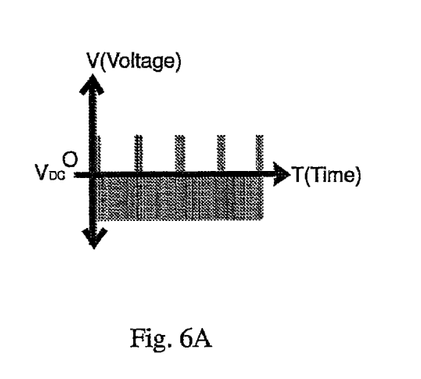
FIG. 6A to 6D are schematic views of second exemplary wave forms of the superimposed time-varying frequency electromagnetic wave according to the invention.
Figure 6B:
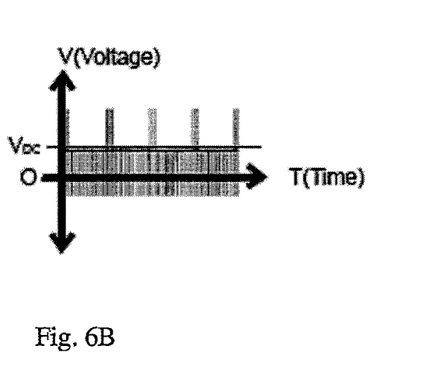
Figure 6C:
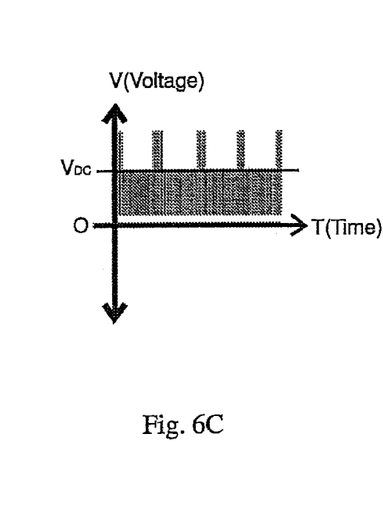
Figure 6D:
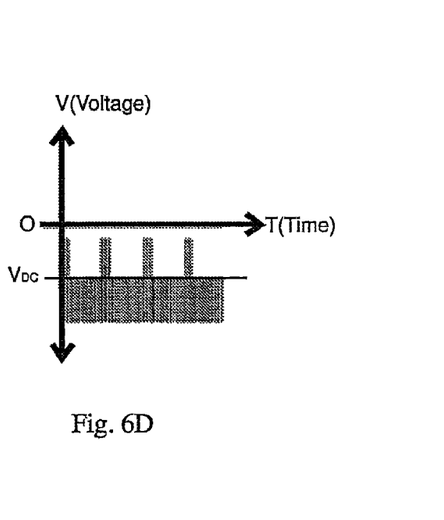
Figure 7A:
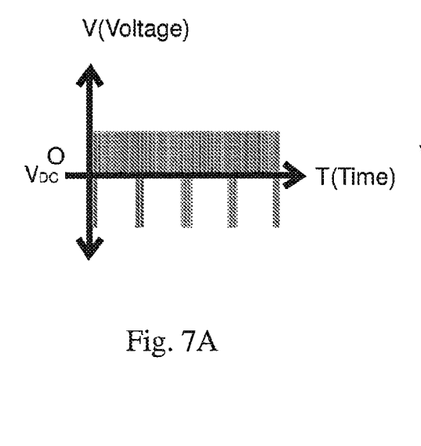
FIG. 7A to 7D are schematic views of third exemplary wave forms of the superimposed time-varying frequency electromagnetic wave according to the invention.
Figure 7B:
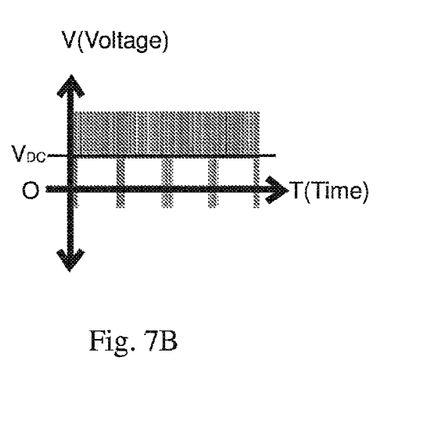
Figure 7C:
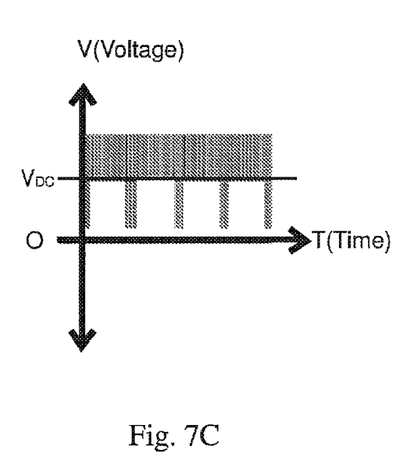
Figure 7D:
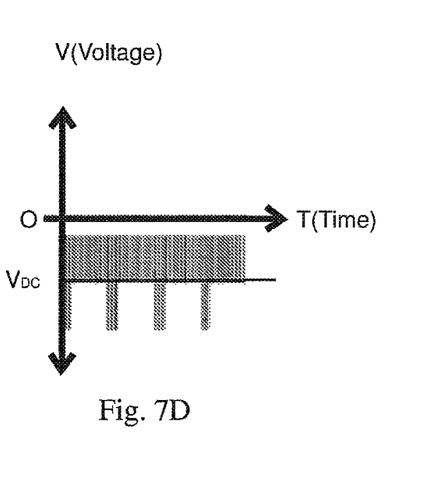

When the input DC signal is provided to the AC wave generator 112, the generator 112 would generate and amplify a AC driving signal corresponding to the time-varying frequency AC electromagnetic wave at a specific sweeping time, which is a wave for example in sine wave form (see FIGS. 5A to 5C). The amplified AC driving signal of the time-varying frequency AC alternating electromagnetic wave is delivered to the DC biasing unit 116 where the DC bias output having a predefined a bias voltage $V_{DC}$ is mixed with the AC driving signal. The result of such a mix is an AC-DC superimposed signal where the time-varying AC electromagnetic wave is riding on the DC preset level to produce the superimposed time-varying frequency electromagnetic wave (hereinafter called "DAC wave") having a mixed-frequency voltage. In the DAC wave, the DC component is not static rather travels in pulsating and time-varying manner along with the AC component. Therefore, there will be pulsing ionic wave current containing the DC component produced in the liquid 130, i.e. there is physical ions or charges flowing in the liquid 130, which is the important and distinguishing feature of the invention. After being subject to such an ionic wave current, the internal energy including vibration and rotation energy of the liquid would be changed, with the result of producing the liquid molecule clusters carrying electrons. This can change the clustering arrangement of the liquid molecule, and more importantly, the energy is able to store in the liquid for a period of time before it is completely dissipated to the surrounding. The stored energy in the liquid would play an important role for the various treatment effects. For example, if the liquid with the stored energy is sprayed into a reaction chamber, it allows the gas phase reaction to proceed and resulting in the conversion of the pollutant gases into its excited species, compounds, ions or elements.

In some cases, it is required to control the DAC wave to have a controllable DC superimposition magnitude. For example, when the DAC wave is applied for the bio-fouling control purpose, the DC biasing voltage $V_{DC}$ may be set such that the DC superimposition magnitude can be controlled to vary between −60 V to +60 V in continuous variations or in steps, and of course higher voltage can be applied. In general the maximum limit of the DC imposition magnitude is determined by the safety operating limit and is controlled to be less than the pulsating wave peak voltage. The negative and positive polarity may be set permanently or be controlled by switching the terminal polarity at frequency either pre-programmed or manually.

The polarity of the DAC wave is characterized mainly by the DC component and depends on the polarity of the DC component and the overall loop power source current flow direction. The average voltage of the DAC wave can be seen as having two components, one being the AC amplitude and the other being the DC bias voltage. Each of these magnitudes has its own function, but also they are often providing a synergy effect to each other. In some scenarios, a large AC voltage amplitude is necessary, for example, to deter the bio-organism attachment. While in other scenarios, the DC magnitude (i.e. the DC bias voltage) is important, for example, in providing sufficient current density covering the structure surfaces to be protected in corrosion control to meet the full corrosion protection criteria. Also, the ratio of AC to DC amplitudes is important in some applications such as controlling the types of disinfectant produced. High DC magnitude can generate more long residual time disinfectant whereas the high AC magnitude can produce more short life disinfectant. Therefore, the AC amplitude voltage and the DC bias voltage may be adjusted and selected according to the actual applications the DAC wave finds.

In this embodiment, the polarity of the DAC wave would be changed asymmetrically as shown in FIGS. 5A to 5C. In FIG. 5A the DAC sine wave never goes negative, in FIG. 5C the DAC sine wave never goes positive, and in FIG. 5B the DAC sine wave spends more time positive than negative. One of the methods for changing the polarity of the DAC wave is to configure the DC biasing unit to give different DC bias voltages $V_{DC}$ so that the polarity of the DAC sine wave may be varied, if desired.

Figure 8A:
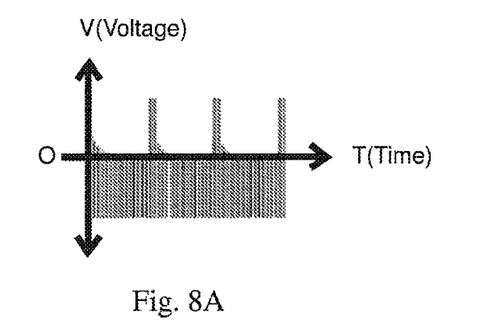
FIG. 8A to 8C are schematic views of fourth exemplary wave forms of the superimposed time-varying frequency electromagnetic wave according to the invention.
Figure 8B:
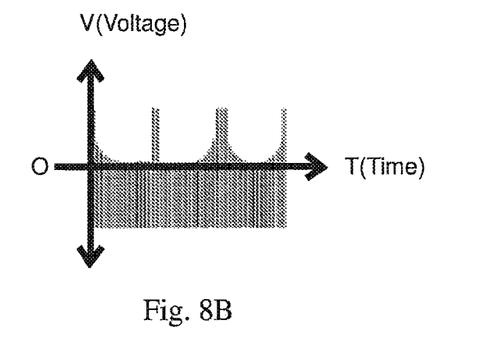
Figure 8C:
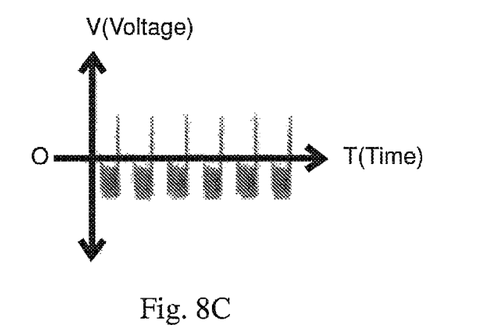

Non-sine wave forms are possible for the invention, for example square wave, rectangular wave, triangular wave or the like. FIGS. 6A to 6D and FIGS. 7A to 7D illustrate some possible variations of the wave forms. In certain applications of the DAC wave, for instance, when the DAC wave is applied to seawater in order to prevent the bio-fouling attachment, a distorted waveform instead of regular waveform could result in better effects in bio-organisms control. It is believed that the bio-organisms would find it more difficult to adapt to the changes in waveform hence more effective disinfection result can be realized. In FIGS. 8A to 8C, there is illustrated some examples of wave distortion. The distorted wave may be obtained by filtering diodes, filter circuits means, or the AC wave generator may be programmed to produce many other possible distorted waveforms.

Figure 2:
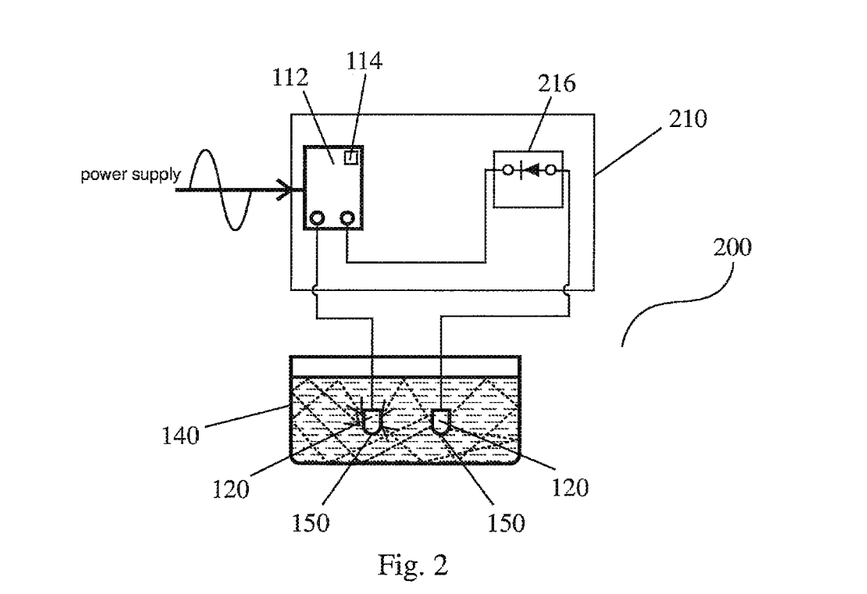
FIG. 2 is a schematic view of an exemplary arrangement of a system which is constructed in accordance with a second embodiment of the invention.
Figure 9A:
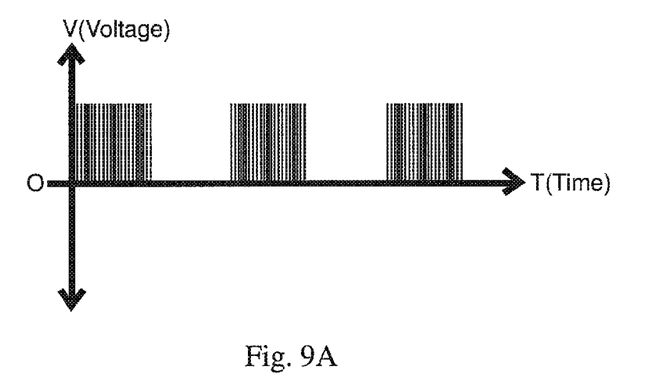
FIGS. 9A and 9B are schematic views of fifth exemplary wave forms of the superimposed time-varying frequency electromagnetic wave according to the invention.
Figure 9B:
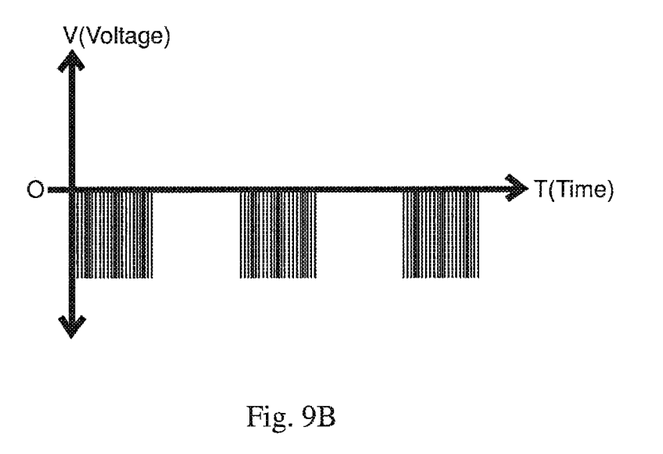

Now turning to FIG. 2, there is illustrated a system 200 constructed consistent with a second embodiment of the present invention. The system 200 of this embodiment is structurally same as the one shown in the first embodiment above, except that an inductive diode filter 216 is selected as the DC biasing unit. The inductive diode filter 216 functions to filter all or part of the positive or negative half of the time-varying frequency AC electromagnetic wave to yield asymmetrical wave having only positive component or negative component. In this embodiment, the DAC wave is biased to have an amplitude toward only the positive or negative direction and generate the wave forms as shown in FIGS. 9A and 9B.

Figure 3A:
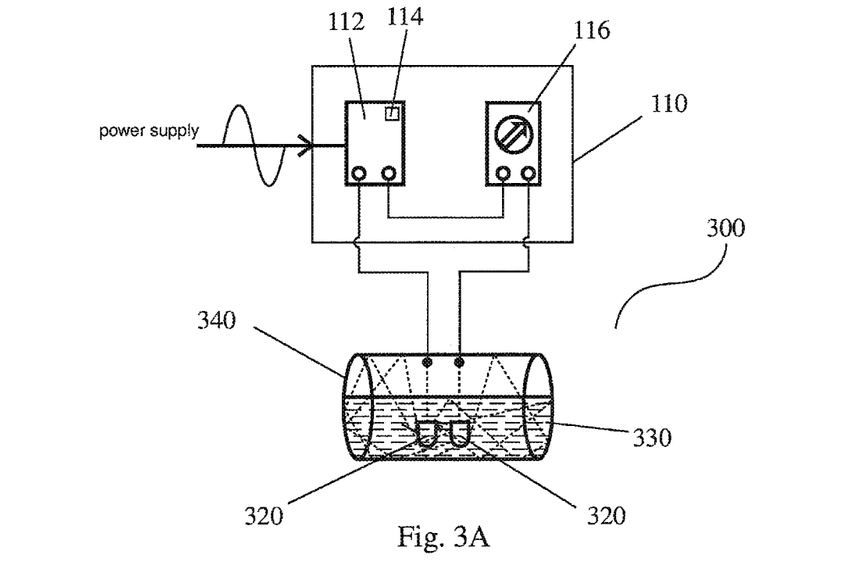
FIGS. 3A and 3B are a schematic view of an exemplary arrangement of a system which is constructed in accordance with a third embodiment of the invention.
Figure 3B:
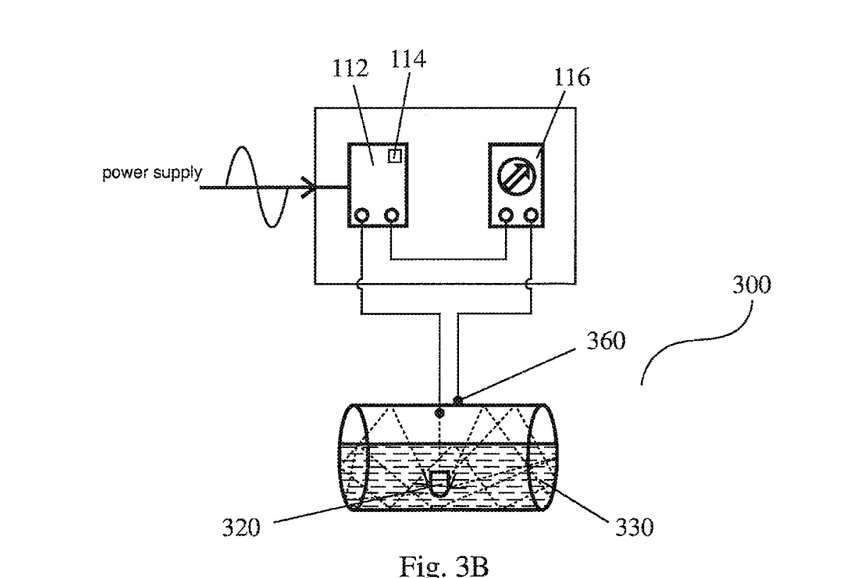

FIGS. 3A and 3B illustrate a system 300 constructed consistent with a third embodiment of the present invention. The system 300 of this embodiment is structurally same as the one shown in the first embodiment above, except that the pipe 340 and the fluid 330 flowing in the pipe 340 form together to a target region to be treated. In FIG. 3A, the pipe 340 is made of a non-metallic material so the two actuators 320 are placed to connect with the first and second excitation sites located in the fluid. An inductor may be arranged to connect with the one of the excitation sites, if needed, to enhance the electromagnetic effect. In FIG. 3B, the pipe 340 is made of a metallic material, in this case, one actuator 320 is placed to connect with the excitation site located in the fluid.

The other of the excitation site of the target region is positioned on of the pipe 340 itself, and this recitation site is directly electrically coupled with the output terminal of the device for generating the DAC wave. It shall be noted that the DAC wave can go randomly towards different directions in the liquid 330 and in the pipe 340, which ensures that many blind spots or zones in the liquid and in the pipe can be reached by the DAC wave and therefore are subject to the DAC wave treatment.

Figure 4A:
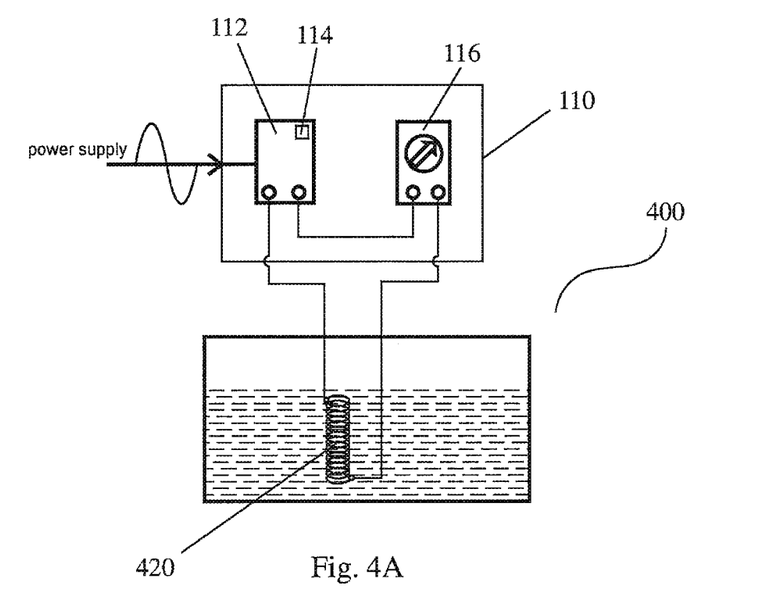
FIGS. 4A and 4B are a schematic view of an exemplary arrangement of a system which is constructed in accordance with a fourth embodiment of the invention.
Figure 4B:
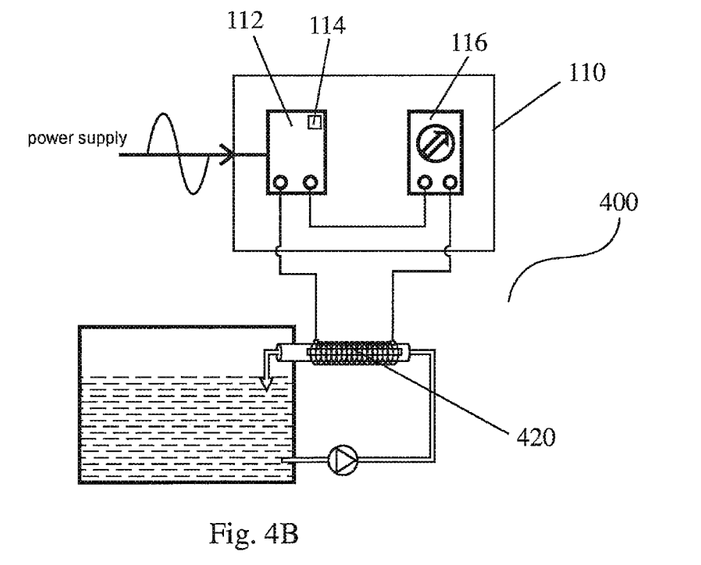

FIGS. 4A and 4B illustrate a system 400 constructed consistent with a fourth embodiment of the present invention. The system 400 of this embodiment is structurally same as the one shown in the first embodiment above, except that the actuators are provided in the form of a coil 420 to excite the target region. Ferrite may be incorporated within the coil or outside the coil to enhance the magnetic field effect. Likewise, the coil 420 may be immersed in the liquid (FIG. 4A) or above the liquid (4B).

According to the invention, the medium serving as a part of the target region to be treated may be soil surrounding the buried structures, like oil pipelines. The DAC wave of the invention may be applied to the buried structures to provide corrosion protection. Due to the asymmetrical wave forms and the DC components carried in the DAC wave, the DAC has the ability to excite the metallic structures directly and yet able to travel a long distance in the soil and the fluid flowing in the structures to allow protection at the remote end of the structure from one actuator source. In this method, the actuator may be placed in the electrolyte which can be soil, water, or other conductive media which allows the passage of current. The location of the actuator may be placed at a long distance from the structure such that the potential gradient created in the electrolyte is the minimal. When the actuator is placed "remotely" from the structures or vice versa, the DAC wave will be able to distribute evenly across the entire structure surface, providing the uniform and complete corrosion protection.

The systems discussed in the above embodiments can produce the required DAC wave uniquely. The right system can be chosen to imply in the specific application for the right treatment effect.

The invention thus provides a system and a method for applying a superimposed time-varying frequency electromagnetic wave to a target object or a target region which is very simple, relatively inexpensive, and more environmentally sound, and which is effective to provide various treatment in one go. In this invention, the pulsating and time-varying DC component in the DAC wave is expected to propagate in all directions to cover the entire target object and region. It is surprising to find that this DC component results in many unexpected technical treatment effects as mentioned above.

While the embodiments described herein are intended as an exemplary system and method, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A system for applying a superimposed time-varying frequency electromagnetic wave to a target object or a target region that is formed by the target object and a medium surrounding the target object, the system comprising:
  a device for generating the superimposed time-varying frequency electromagnetic wave, the device including:
    at least two output terminals;
    an alternating current (AC) wave generator configured to generate an AC driving signal of an AC electromagnetic wave having a time-varying frequency at a desired sweeping time; and
    a direct current (DC) biasing unit electrically coupled in series with the AC wave generator, the DC biasing unit configured to produce a DC output with a predefined DC bias voltage, to receive the AC driving signal, and to mix the DC output with the AC driving signal to produce the superimposed time-varying frequency electromagnetic wave where the time-varying frequency AC electromagnetic wave is riding on the predefined DC bias voltage, and
  an actuator provided at one or both of a first excitation site and a second excitation site of the target object or the target region and electrically coupled in series with one of the at least two output terminals of the device,
  wherein the device is electrically coupled in series with the first excitation site and the second excitation site of the target object or the target region directly or through the actuator and
  the device is configured to superimpose the DC bias output and the AC driving signal to produce the superimposed time-varying frequency electromagnetic wave for applying to the target object or the target region to induce a flow of ionic current having a DC component traveling in a pulsating and time-varying manner in the target object and/or in the medium and effect induced vibration of electrons and molecules of the target object and the medium.

2. The system as claimed in claim 1, wherein the DC biasing unit is selected from the group consisting of a switch mode DC power supply, an AC to DC converter, a rechargeable DC battery, and an inductive diode filter.

3. The system as claimed in claim 2, wherein the device for generating the superimposed time-varying frequency electromagnetic wave is a prefabricated electronic circuit.

4. The system as claimed in claim 1, wherein the DC bias voltage is selected such that the superimposed time-varying frequency electromagnetic wave has polar asymmetry or is a unidirectional pulsating wave.

5. The system as claimed in claim 1, wherein the DC biasing unit is select to produce the superimposed time-varying frequency electromagnetic wave that has half-wave distortion or full-wave distortion.

6. The system as claimed in claim 1, wherein the superimposed time-varying frequency electromagnetic wave is in square, triangular, rectangular, or sine form.

7. The system as claimed in claim 1, wherein the DC bias voltage is controlled to vary continuously or in steps and to be less than a peak voltage of the AC driving signal.

8. The system as claimed in claim 1, wherein the target object is made of an electrically non-conductive material, and if the first and/or second excitation sites are positioned on the electrically non-conductive target object, the actuator is provided at the respective excitation site to be electrically coupled with the device.

9. The system as claimed in claim 1, wherein the frequency of the superimposed time-varying frequency electromagnetic wave is between about 100 Hz and about 1 MHz.

10. The system as claimed in claim 1, wherein the sweeping frequency of the superimposed time-varying frequency electromagnetic wave is between about 1 Hz and about 1 KHz.

11. The system as claimed in claim 1, wherein both the first and second excitation sites are positioned on the target object or in the medium in a spaced relation, or one of the first and second excitation sites is positioned on the target object, and the other is positioned in the medium.

12. The system as claimed in claim 1, wherein the actuator is in the form of a coil.

13. The system as claimed in claim 1, wherein the AC wave generator comprises a control unit configured to generate a signal having the time-varying frequency at the desired sweeping time, and one or more bridge-type circuits coupled to the control unit for receiving the signal generated from the control unit, the one or more bridge-type circuits being driven by the received signal to generate and amplify the AC driving signal of the time-varying frequency AC electromagnetic wave, wherein the one or more bridge-type circuits are configured to comprise one or more half-bridge driver integrated circuits (ICs) and one or more Metal Oxide Semiconductor Field Effect Transistors coupled to the respective half-bridge driver ICs.

14. The system as claimed in claim 13, wherein the control unit comprises a programmable integrated circuit for time-varying the frequency of the AC driving signal, and, optionally, a stabilizer circuit for stabilizing the AC driving signal.

15. The system as claimed in claim 9, wherein the frequency of the superimposed time-varying frequency electromagnetic wave is between about 100 Hz and about 200 KHz.

16. The system as claimed in claim 10, wherein the sweeping frequency of the superimposed time-varying frequency electromagnetic wave is between about 10 Hz and about 100 Hz.

* * * * *